United States Patent
Choi et al.

(10) Patent No.: US 10,393,191 B2
(45) Date of Patent: Aug. 27, 2019

(54) SYNCHRONIZER OF TRANSMISSION

(71) Applicants: Hyundai Motor Company, Seoul (KR); Kia Motors Corporation, Seoul (KR)

(72) Inventors: Jae Young Choi, Busan (KR); Sung Wha Hong, Hwaseong-si (KR); Jong Yun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 15/818,640

(22) Filed: Nov. 20, 2017

(65) Prior Publication Data

US 2018/0372167 A1    Dec. 27, 2018

(30) Foreign Application Priority Data

Jun. 21, 2017    (KR) ........................ 10-2017-0078585

(51) Int. Cl.
    *F16D 23/02*    (2006.01)
    *F16D 11/14*    (2006.01)
    *F16D 23/06*    (2006.01)
    *F16H 63/30*    (2006.01)

(52) U.S. Cl.
    CPC ............ *F16D 23/025* (2013.01); *F16D 11/14* (2013.01); *F16D 23/0612* (2013.01); *F16D 2023/065* (2013.01); *F16D 2023/0618* (2013.01); *F16H 63/30* (2013.01); *F16H 2063/3096* (2013.01)

(58) Field of Classification Search
    CPC ........ F16D 23/025; F16D 11/14; F16D 23/02; F16D 23/06; F16D 23/0606; F16D 23/0612; F16D 23/10; F16D 2023/0618; F16D 2023/0631; F16D 2023/0637; F16D 2023/065; F16H 63/30; F16H 2063/3096
    See application file for complete search history.

(56) References Cited

U.S. PATENT DOCUMENTS

| | | |
|---|---|---|
| 2,521,730 A | 9/1950 | Keese |
| 3,548,983 A | 12/1970 | Hiraiwa |
| 4,300,668 A | 11/1981 | Nozawa et al. |

(Continued)

FOREIGN PATENT DOCUMENTS

| | | |
|---|---|---|
| DE | 1924724 | 11/1969 |
| DE | 2 222 080 | 11/1973 |

(Continued)

*Primary Examiner* — Jacob S. Scott
*Assistant Examiner* — James J Taylor, II
(74) *Attorney, Agent, or Firm* — Morgan, Lewis & Bockius LLP

(57) ABSTRACT

A synchronizer of a transmission may include bottom key disposed on a hub to be slidable in a radial direction of the hub; a top key disposed radially outside the bottom key to be slidable in an axial direction of the hub; a sleeve disposed outside the hub and sliding in the axial direction to slide the top key in the axial direction to press a synchro-ring; a key spring disposed between the bottom key and the hub to press the bottom key and the top key toward an internal side of the sleeve; and a motion converting portion converting relative motion generated in a circumferential direction of the hub between the top key and the bottom key into axial relative motion of the top key to the bottom key toward the synchro-ring.

9 Claims, 11 Drawing Sheets

(56) References Cited

U.S. PATENT DOCUMENTS

| | | | | |
|---|---|---|---|---|
| 8,104,597 | B2 * | 1/2012 | Hackl | ............... F16D 23/06 |
| | | | | 192/53.31 |
| 8,511,451 | B2 * | 8/2013 | Ledetzky | ............ F16D 23/06 |
| | | | | 192/53.341 |
| 8,528,435 | B2 | 9/2013 | Hackl et al. | |
| 8,733,523 | B2 * | 5/2014 | Pamminger | ......... F16D 23/06 |
| | | | | 192/53.31 |
| 2008/0066568 | A1 | 3/2008 | Hackl et al. | |
| 2010/0263979 | A1 | 10/2010 | Pamminger et al. | |
| 2011/0272234 | A1 | 11/2011 | Park | |
| 2017/0343056 | A1 | 11/2017 | Horiguchi et al. | |
| 2018/0045252 | A1 | 2/2018 | Omori | |
| 2018/0142740 | A1 | 5/2018 | Park et al. | |
| 2018/0372167 | A1 | 12/2018 | Choi et al. | |

FOREIGN PATENT DOCUMENTS

| | | | |
|---|---|---|---|
| DE | 10 2008 061 967 A1 | 6/2010 | |
| DE | 10 2010 005 705 A1 | 7/2011 | |
| DE | 10 2015 215 642 A1 | 2/2017 | |
| DE | 10 2015 118 879 A1 | 5/2017 | |
| EP | 2 475 907 B1 | 3/2016 | |
| JP | 2014-029167 A | 2/2014 | |
| KR | 10-0379629 B1 | 4/2003 | |
| KR | 10-2011-0123967 A | 11/2011 | |
| KR | 10-1417529 B1 | 7/2014 | |
| KR | 10-1518120 B1 | 5/2015 | |
| WO | WO 2011/029490 A1 | 3/2011 | |
| WO | WO-2011029585 A1 * | 3/2011 | ............ F16L 23/06 |

* cited by examiner

SYNCHRONIZER OF TRANSMISSION

CROSS REFERENCE TO RELATED APPLICATION

The present application claims priority to Korean Patent Application No. 10-2017-0078585, filed Jun. 21, 2017, the entire contents of which is incorporated herein for all purposes by this reference.

BACKGROUND OF THE INVENTION

Field of the Invention

The present invention relates to a synchronizer of a transmission and, more particularly to a synchronizer of a transmission that can be applied to synchromesh type shift mechanism.

Description of Related Art

A synchromesh type shift mechanism is configured such that when a synchronizer ring is pressed by a key due to axial movement of a sleeve coupled to a hub through splines, the speeds of the hub, the sleeve, and a clutch gear are synchronized by friction force generated between the synchronizer ring and the clutch cone of the clutch gear, so the sleeve is engaged with the clutch gear, whereby power is transmitted between a shift gear engaged with the clutch gear and the hub.

When the sleeve is axially moved by an actuator, there is the advantage that the smaller the force for moving the sleeve, the more the capacity of the actuator can be reduced.

Furthermore, the parts of the shift mechanism should have sufficient durability.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a synchronizer for a transmission that can improve durability of the parts of a synchromesh type shift mechanism and reduce the capacity of an actuator for moving a sleeve by reducing force operating the sleeve for synchronization.

To achieve the objects the present invention, a synchronizer of a transmission the present invention may include a bottom key disposed on a hub to be slidable in a radial direction of the hub; a top key disposed radially outside the bottom key to be slidable in an axial direction of the hub; a sleeve disposed outside the hub and sliding in the axial direction to slide the top key in the axial direction to press a synchro-ring; a key spring disposed between the bottom key and the hub to press the bottom key and the top key toward an internal side of the sleeve; and a motion converting portion converting relative motion generated in a circumferential direction of the hub between the top key and the bottom key into axial relative motion of the top key to the bottom key toward the synchro-ring.

A protruding-retracting structure may be formed at both circumferential sides of the bottom key between the bottom key and the hub so that the bottom key radially slides with respect to the hub.

Radial grooves may be formed on both the circumferential sides of the bottom key and radial projections inserted into the radial grooves of the bottom key may be formed on the hub, so the protruding-retracting structure is formed by the radial grooves and the radial projections.

A groove may be formed on a radial external side of the bottom key so that the top key axially slides therein, and the motion converting portion is formed by shapes of the groove and the top key.

The groove may include a first groove closer to the hub, a second groove closer to the synchro-ring, and inclined groove surfaces connecting the first groove and the second groove to each other, the top key may have top key-chamfered surfaces at both corners of an end portion facing the hub to come in surface-contact with the inclined groove surfaces, and the motion converting portion may be formed by the inclined groove surfaces and the top key-chamfered surfaces.

A top key-rotating groove may be formed on the synchro-ring to cover both circumferential sides of the top key such that the top key-chamfered surfaces come in surface-contact with the inclined groove surfaces by rotating the top key relatively to the hub and the bottom key when the top key is rotated relatively to the hub to press the synchro-ring by the sleeve.

An upper portion of the top key may have a trapezoidal cross-section with a top portion narrower when the top key is cut in the radial direction to be pressed radially inward when the sleeve axially slides.

The bottom key may have bottom key-chamfered surfaces formed on both circumferential sides such that the sides narrow as going radially inwardly, and the synchro-ring may have synchro-inclined surfaces being in surface-contact with the bottom key-chamfered surfaces.

The key spring may be a coil spring inserted into a bottom groove of the bottom key from the hub.

According to an exemplary embodiment of the present invention, it is possible to improve durability of the parts of a synchromesh type shift mechanism and reduce the capacity of an actuator for moving a sleeve by reducing force operating the sleeve for synchronization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
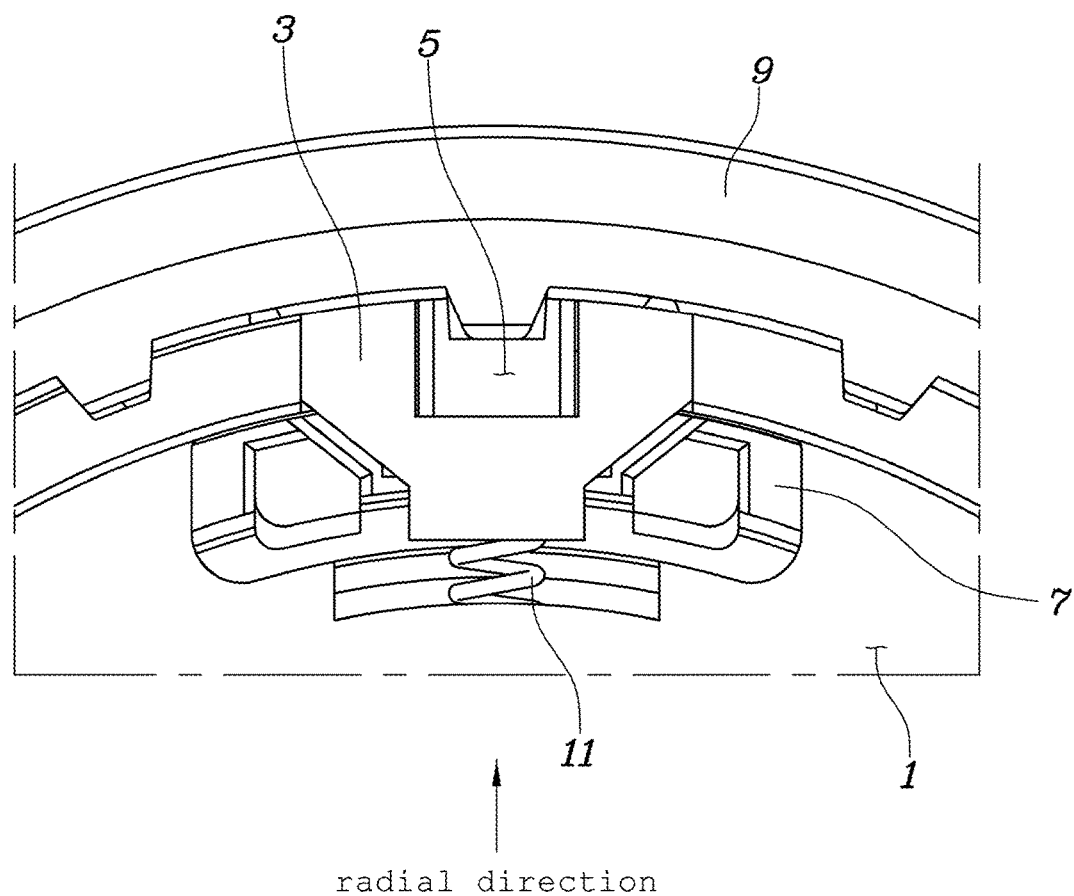
FIG. 1 is a view showing the structure of a synchronizer of a transmission according to an exemplary embodiment of the present invention when a synchro-ring is axially seen from a hub.
Figure 2:
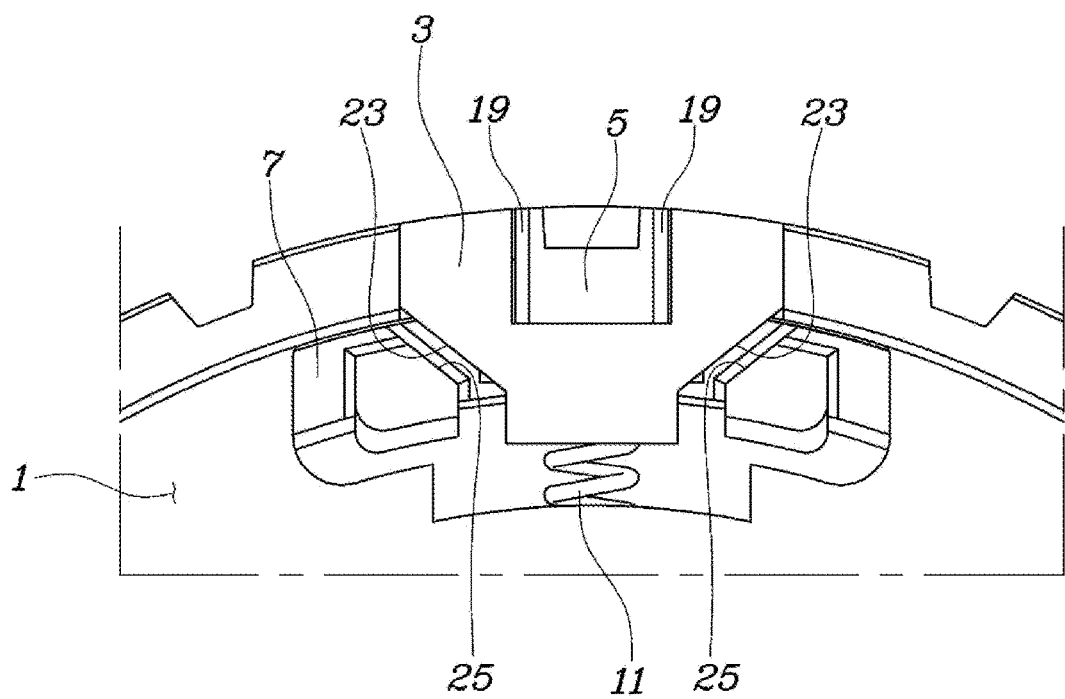
FIG. 2 is a view showing the structure with a sleeve and a clutch gear removed.
Figure 3:
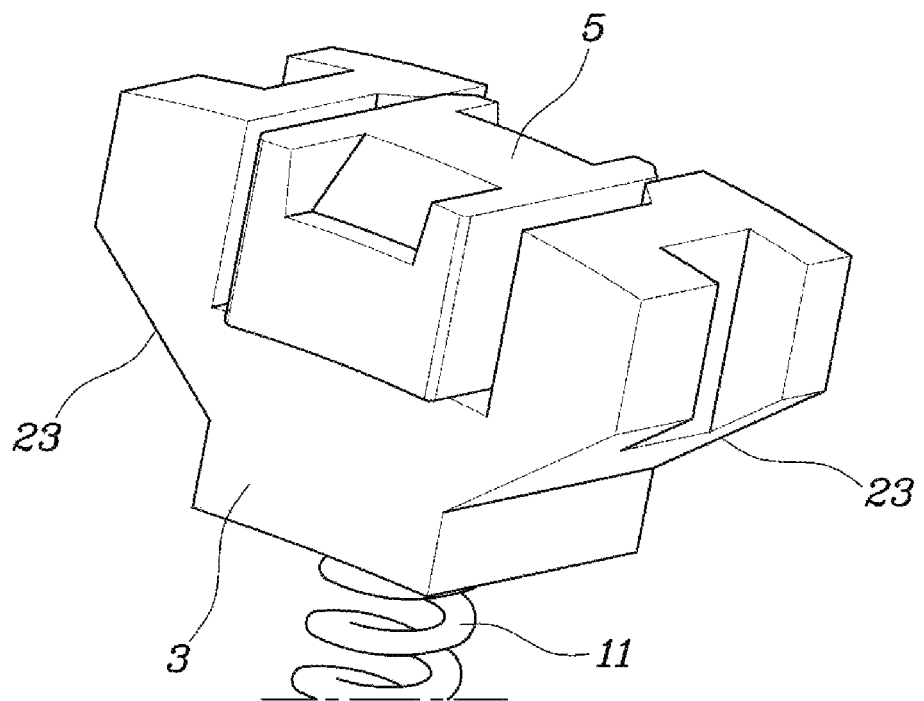
FIG. 3 is a view showing a bottom key, a top key, and a key spring of FIG. 1 when seen in the opposite direction to FIG. 2.
Figure 4:
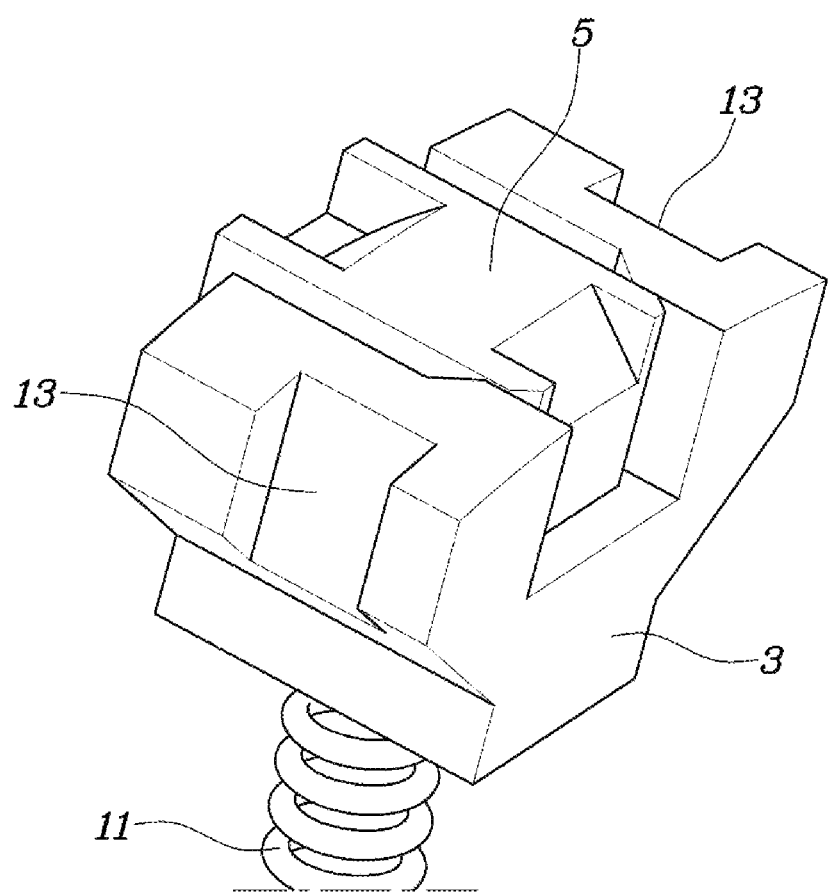
FIG. 4 is a view showing the bottom key, top key, and key spring of FIG. 2 when seen at another angle.
Figure 5:
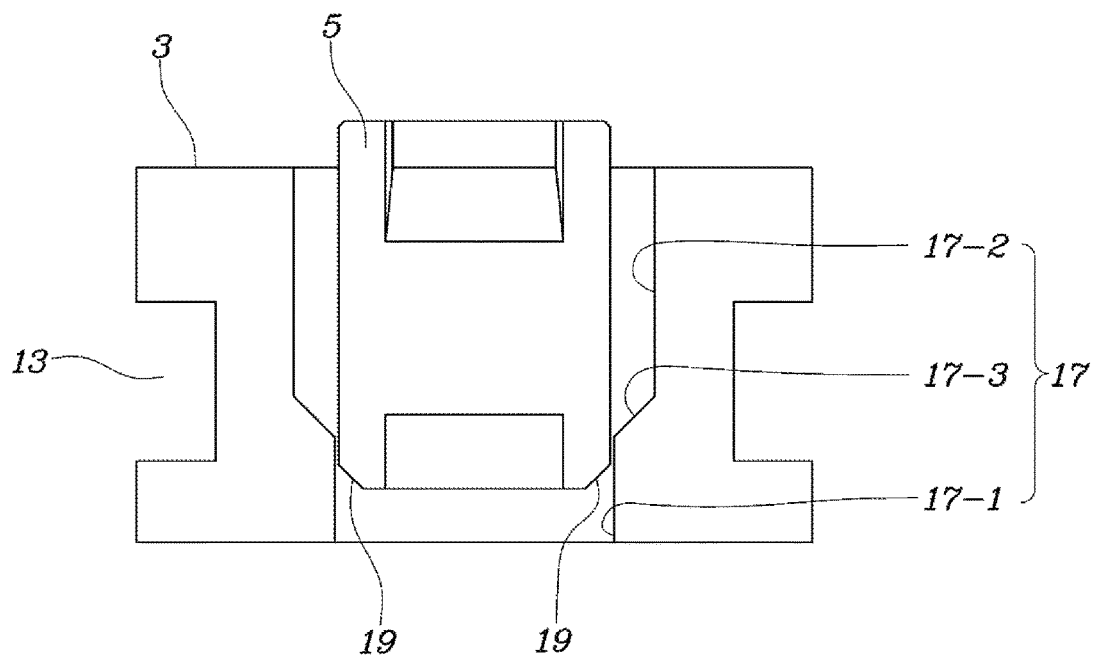
FIG. 5 is a view showing the bottom key and the top key when seen in the axial direction of the hub.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 11, a synchronizer of a transmission according to an exemplary embodiment of the present invention may include a bottom key 3 disposed on a hub 1 to be slidable in the radial direction of the hub 1; a top key 5 disposed radially outside the bottom key 3 to be slidable in the axial direction of the hub 1; a sleeve 9 disposed outside the hub 1 and sliding in the axial direction to slide the top key 5 in the axial direction to press a synchro-ring 7; a key spring 11 disposed between the bottom key 3 and the hub 1 to press the bottom key 3 and the top key 5 toward the internal side of the sleeve 9; and a motion converting portion converting relative motion generated in the circumferential direction of the hub 1 between the top key 5 and the bottom key 3 into axial relative motion of the top key 5 to the bottom key 3 toward the synchro-ring 7.

That is, according to an exemplary embodiment of the present invention, when the sleeve 9 slides the top key 5 toward the synchro-ring 7 by being slid by an actuator from a neutral position in shifting, the top key 5 is further pressed toward the synchro-ring 7 by the motion converting portion, the hub 1 and the sleeve 9 are synchronized with the synchro-ring 7 and a clutch gear, and the bottom key 3 is moved radially inward and achieve indexing, so the sleeve 9 is engaged with the clutch gear, performing shifting.

A protruding-retracting structure is formed at both circumferential sides of the bottom key 3 between the bottom key 3 and the hub 1 so that the bottom key 3 can radially slide with respect to the hub 1.

In the exemplary embodiment of the present invention, radial grooves 13 are formed on both circumferential sides of the bottom key 3 and radial projections 15 inserted into the radial grooves 13 of the bottom key 3 are formed on the hub 1, so the protruding-retracting structure is formed by the radial grooves 13 and the radial projections 15.

Obviously, in the interactive protruding-retracting structure, the projections and the grooves on the hub 1 and the bottom key 3 may be switched and the numbers of the projections and grooves may be changed.

A groove 17 is formed on the radial external side of the bottom key 3 so that the top key 5 can axially slide therein and the motion converting portion is formed by the shapes of the groove 17 and the top key 5.

That is, the top key 5 is disposed to be able the axially slide with respect to the bottom key 3, and as described below, it can relatively circumferentially move within a slight range.

The groove 17 may include a first groove 17-1 closer to the hub 1, a second groove 17-2 closer to the synchro-ring 7, and inclined groove surfaces 17-3 connecting the first groove 17-1 and the second groove 17-2 to each other. The top key 5 has top key-chamfered surfaces 19 at both corners of the end portion facing the hub 1 to come in surface-contact with the inclined groove surfaces 17-3 and the motion converting portion is formed by the inclined groove surfaces 17-3 and the top key-chamfered surfaces 19.

A top key-rotating groove 21 is formed on the synchro-ring 7 to cover both circumferential sides of the top key 5 such that the top key-chamfered surfaces 19 come in surface-contact with the inclined groove surfaces 17-3 by rotating the top key 5 relatively to the hub 1 and the bottom key 3 when the top key 5 is rotated relatively to the hub 1 to press the synchro-ring 7 by the sleeve 9.

Accordingly, when the top key 5 presses the synchro-ring 7 and the top key-rotating groove 21 rotates the top key 5 in one circumferential direction by axial sliding of the sleeve 9, the top key-chamfered surfaces 19 come in surface-contact with the inclined groove surface 17-3, and circumferential motion of the top key 5 generated in the present process with respect to the bottom key 3 is converted into axial relative motion that further presses the top key 5 to the synchro-ring 7. As a result, the top key 5 presses the synchro-ring 7 with force greater than the force applied to the sleeve 9 by the actuator, so it is possible to sufficiently achieve synchronization for shifting even using an actuator having a relatively small capacity.

The upper portion of the top key 5 has a trapezoidal cross-section with the top portion narrower when it is cut in the radial direction to be pressed radially inward when the sleeve 9 axially slides.

The present configuration is provided so that the sleeve 9 can axially press and slide the top key 5 at the early stage of axial movement of the sleeve 9 from the neutral position and can be easily engaged with a clutch gear while moving radially inward the top key 5 after synchronization.

For reference, the neutral position, which is used herein in the same meaning as the common idea in the related art, means that when shift gears are disposed at sides of the sleeve 9 and the hub 1, but the sleeve 9 is aligned with the hub 1 without being pushed in any direction, no shift gears are engaged.

The bottom key 3 has bottom key-chamfered surfaces 23 formed on both circumferential sides such that the sides narrow as they go radially inward and the synchro-ring 7 has synchro-inclined surfaces 25 being in surface-contact with the bottom key-chamfered surfaces 23.

Accordingly, when the hub 1 and the sleeve 9 are synchronized with the synchro-ring 7 and the clutch gear 19, the bottom key 3 is moved radially inward such that the bottom key-chamfered surfaces 23 slide on the synchro-inclined surfaces 25 by pressure applied radially inward to the hub 1 through the top key 5 by the sleeve 9, whereby so-called indexing is achieved. Accordingly, the sleeve 9 can be engaged with the clutch gear 19 over the synchro-ring 7.

The key spring 11 is a coil spring inserted into a bottom groove of the bottom key 3 from the hub 1.

The coil spring receives only the force applied by the bottom key 3 radially sliding with respect to the hub 1 during the above-mentioned movement of the sleeve 9, the top key 5, and the bottom key 3, so it only longitudinally extends and contracts in accordance with the intention of design without buckling or bending, so the durability is sufficiently secured.

The operation of the synchronizer of a transmission the present invention is described with reference to FIG. 6, FIG. 7, FIG. 8, FIG. 9, FIG. 10, and FIG. 11.

Figure 6:
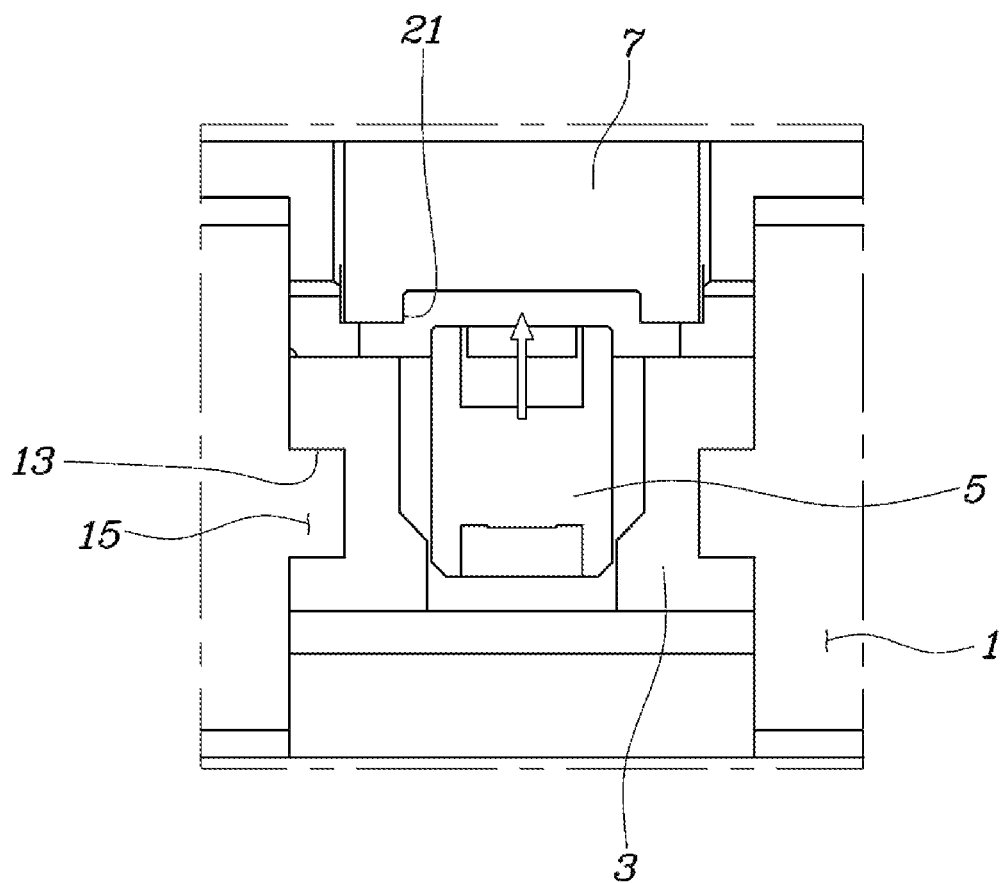
FIG. 6, FIG. 7, FIG. 8, FIG. 9, FIG. 10, and FIG. 11 are views sequentially showing the operation of the synchronizer.

FIG. 6 shows a state when the sleeve 9 starts to move the top key 5 to the synchro-ring 7 by axially sliding.

Figure 7:
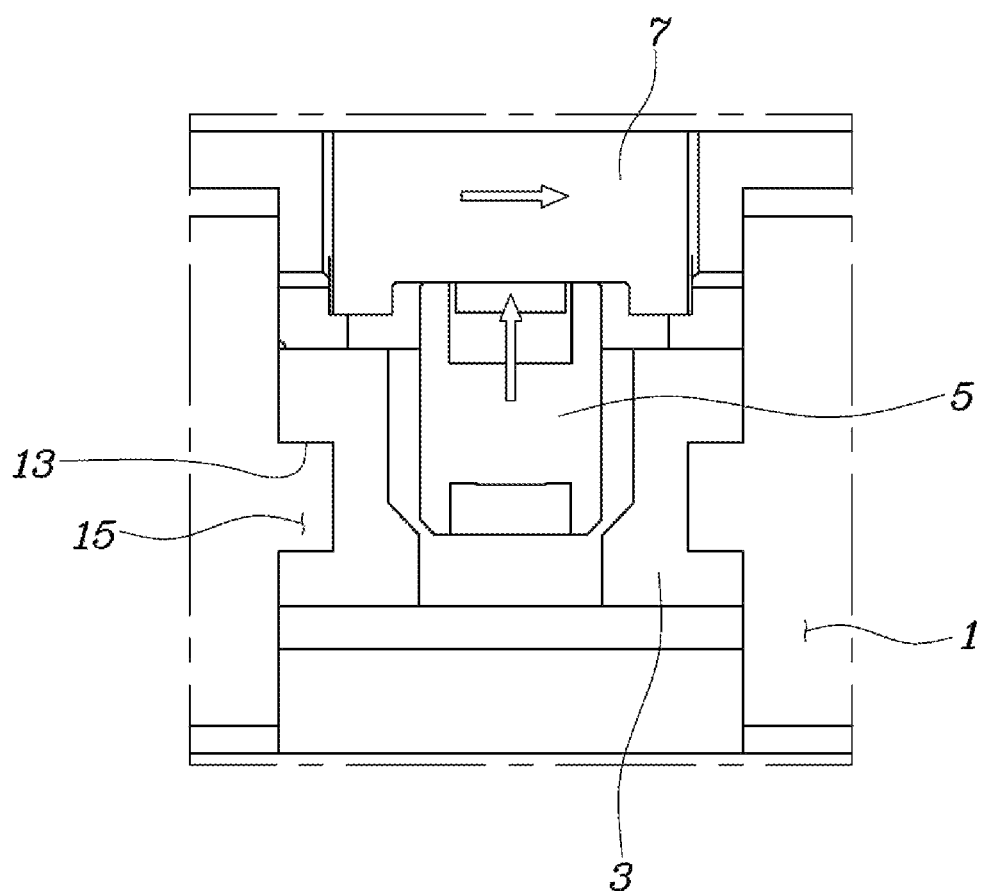

FIG. 7 shows a state in which the top key 5 axially presses the synchro-ring 7, so torque rotating the synchro-ring 7 with respect to the hub 1 with the clutch cone of the clutch gear 19 in contact with the synchro-ring 7 is generated, that is, synchronization is started.

Figure 8:
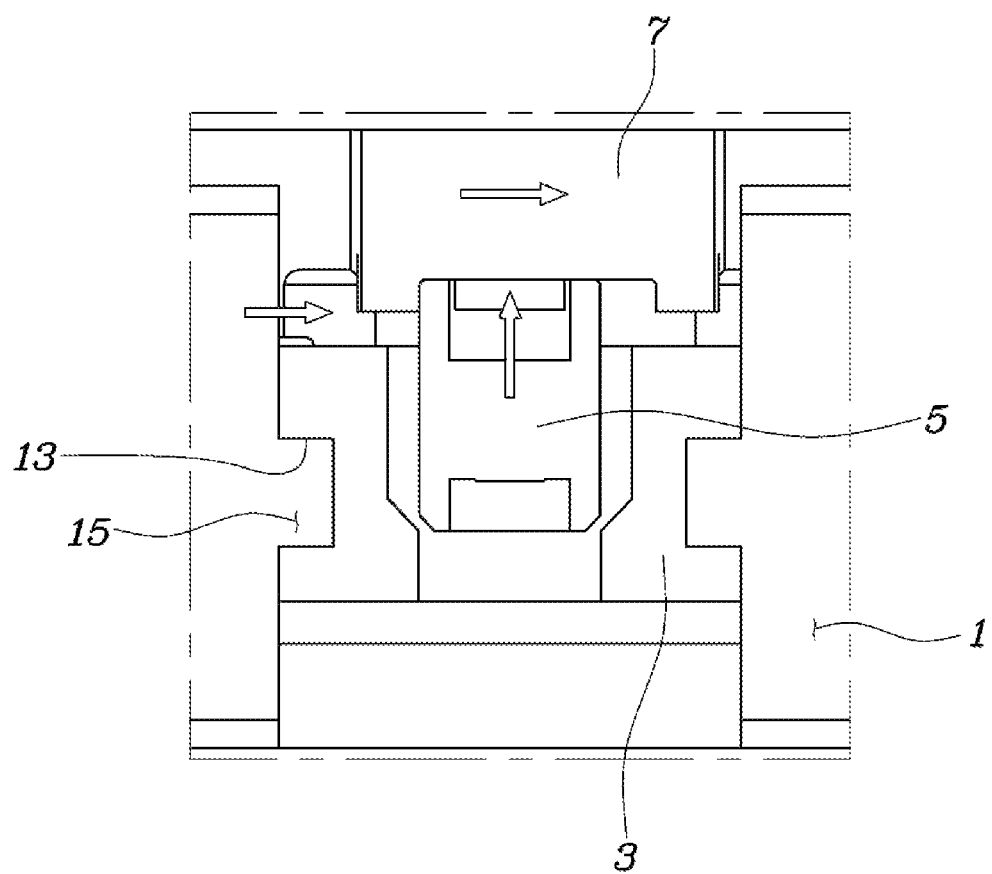

FIG. 8 shows a state when the synchro-ring 7 starts to circumferentially move the top key 5 with the top key-rotating groove 21 by the torque applied to the synchro-ring 7.

Figure 9:
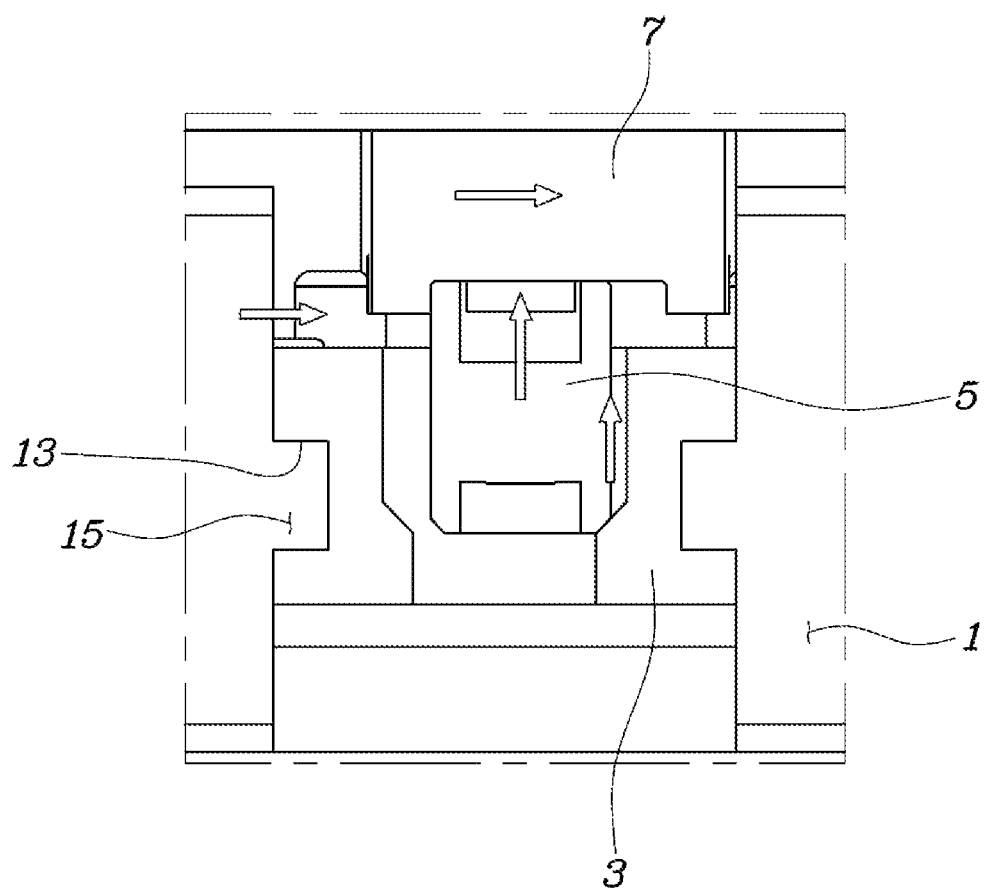

FIG. 9 shows a state in which as a top key-chamfered surface 19 of the top key 5 comes in contact with an inclined groove surface 17-3, the circumferential motion of the top key 5 is converted into axial motion, further pressing the synchro-ring 7.

Figure 10:
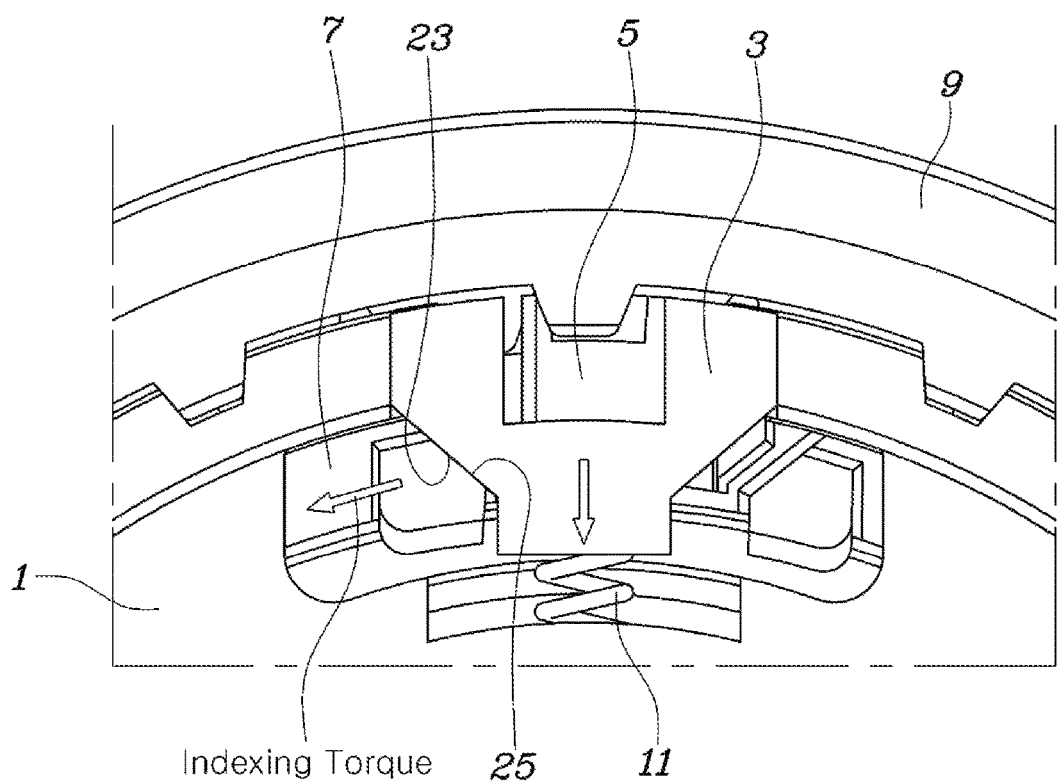
Figure 11:
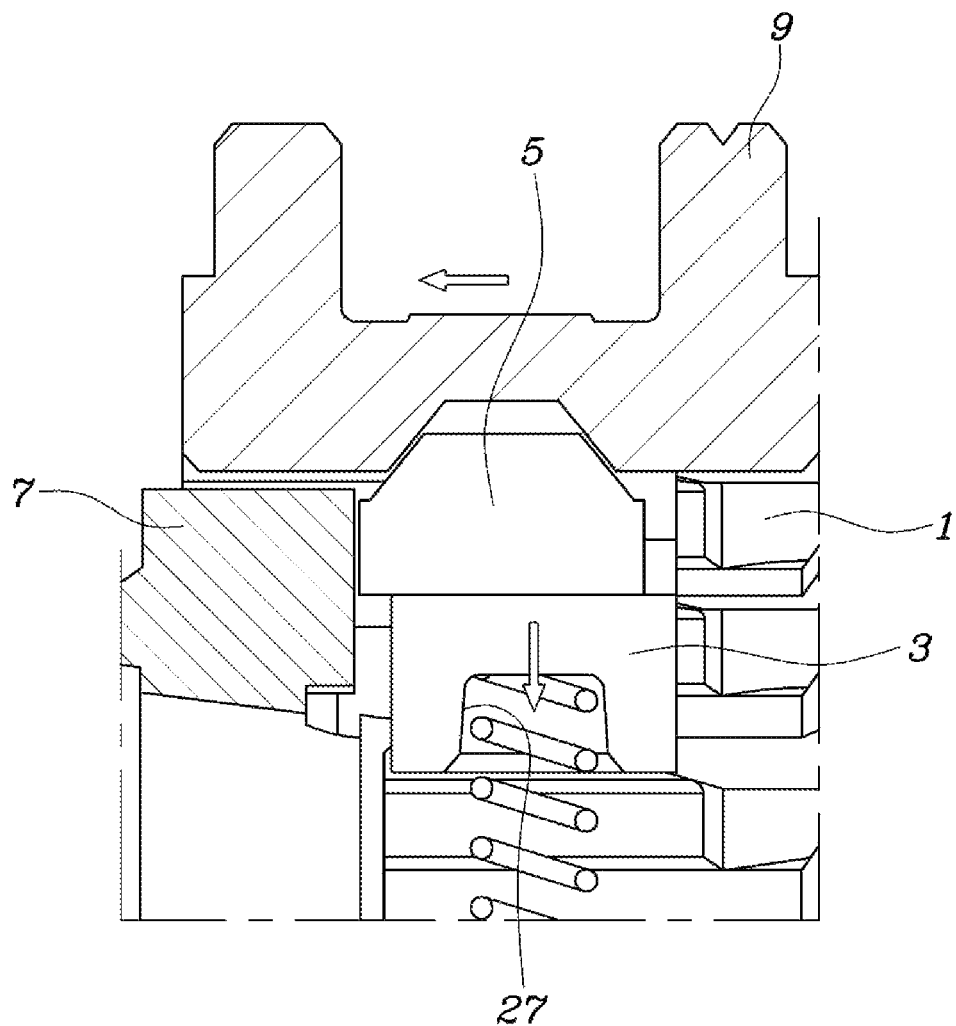

When the top key 5 presses the synchro-ring 7 and the synchro-ring 7 is synchronized with the clutch gear 19, as shown in FIG. 10, and FIG. 11, the sleeve 9 gradually moves the top key 5 radially inwardly, so the bottom key 3 moves radially inward and the bottom key-chamfered surfaces 23 slide on the synchro-inclined surfaces 25. Accordingly, indexing torque that aligns the synchro-ring 7 with the sleeve 9 and the hub 1 such that the sleeve 9 can approach the clutch gear 19 over the top key 5 is applied to the synchro-ring 7, and the sleeve 9 keeps moving forward upon indexing and finally engages with the clutch gear, finishing shifting.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A synchronizer of a transmission, comprising:
    a bottom key disposed on a hub to be slidable in a radial direction of the hub;
    a top key disposed radially outside the bottom key to be slidable in an axial direction of the hub;
    a sleeve disposed outside the hub and sliding in the axial direction to slide the top key in the axial direction to press a synchro-ring;
    a key spring disposed between the bottom key and the hub to press the bottom key and the top key toward an internal side of the sleeve; and
    a motion converting portion converting relative motion generated in a circumferential direction of the hub between the top key and the bottom key into axial relative motion of the top key to the bottom key toward the synchro-ring.

2. The synchronizer of claim 1, wherein a protruding-retracting structure is formed at first and second circumferential sides of the bottom key between the bottom key and the hub so that the bottom key radially slides with respect to the hub.

3. The synchronizer of claim 2, wherein radial grooves are formed on the first and second circumferential sides of the bottom key and radial projections inserted into the radial grooves of the bottom key are formed on the hub, so that the protruding-retracting structure is formed by the radial grooves and the radial projections.

4. The synchronizer of claim 1, wherein a groove is formed on a radial external side of the bottom key so that the top key axially slides therein, and
    the motion converting portion is formed according to shapes of the groove and the top key.

5. The synchronizer of claim 4, wherein the groove includes a first groove closer to the hub, a second groove closer to the synchro-ring, and inclined groove surfaces connecting the first groove and the second groove to each other,
    the top key has top key-chamfered surfaces at first and second corners of an end portion facing the hub to come in contact with the inclined groove surfaces, and
    the motion converting portion is formed by the inclined groove surfaces and the top key-chamfered surfaces.

6. The synchronizer of claim 5, wherein a top key-rotating groove is formed on the synchro-ring to cover first and second circumferential sides of the top key such that the top key-chamfered surfaces come in contact with the inclined groove surfaces by rotating the top key relative to the hub and the bottom key when the top key is rotated relative to the hub to press the synchro-ring by the sleeve.

7. The synchronizer of claim 6, wherein an upper portion of the top key has a trapezoidal cross-section with a top portion narrower when the top key is cut in a radial direction thereof to be pressed radially inward when the sleeve axially slides.

8. The synchronizer of claim 6, wherein the bottom key has bottom key-chamfered surfaces formed on first and second circumferential sides such that the sides narrow as going radially inwardly, and
    the synchro-ring has synchro-inclined surfaces being in contact with the bottom key-chamfered surfaces.

9. The synchronizer of claim 1, wherein the key spring is a coil spring inserted into a bottom groove of the bottom key from the hub.

* * * * *